United States Patent [19]
Baichtal et al.

[11] 3,825,689
[45] July 23, 1974

[54] MESSAGE METERING AND STORAGE SYSTEM

[75] Inventors: James R. Baichtal; John C. McDonald, both of Los Altos, Calif.

[73] Assignee: Vidor Corporation, Mountain View, Calif.

[22] Filed: Jan. 5, 1973

[21] Appl. No.: 321,275

[52] U.S. Cl. .................................. 179/7 R, 179/8 R
[51] Int. Cl. .......................................... H04m 15/10
[58] Field of Search 179/7 R, 7 MM, 7.1 R, 7.1 TP, 179/8 R

[56] References Cited

UNITED STATES PATENTS 3,427,594 2/1969 Lavenir et al. ...................... 179/7 R
3,697,695 10/1972 Pommerening et al. ........ 179/7 MM

*Primary Examiner*—Kathleen H. Claffy
*Assistant Examiner*—Gerald L. Brigance
*Attorney, Agent, or Firm*—Flehr, Hohbach, Test, Albritton & Herbert

[57] ABSTRACT

Disclosed is a local metering system for metering information concerning each subscribers use of a telephone system. Each subscriber is associated with a unique location in memory. The subscriber lines are scanned in accordance with a binary addressing code from an address counter which does not necessarily access subscriber lines in their directory number order. The system storage output circuitry includes means for correlating the binary addressing with the subscriber line directory numbers. The system storage includes a circulating shift register memory which is stepped each time the address counter steps. The control circuitry and memory cyclically test the system each cycle of the address counter. Specific locations in memory are assigned predetermined codes. Failure of the memories to properly read out the code when addressed indicates an error condition. Additionally, a test pattern is employed at directory number address locations. Once each cycle of the address counter the test pattern is compared with information decoded from the address counter to determine if the data paths and storage of the system are operating properly.

15 Claims, 7 Drawing Figures

MESSAGE METERING AND STORAGE SYSTEM

CROSS REFERENCE TO RELATED APPLICATIONS

1. MESSAGE METERING SYSTEM, invented by JOHN C. McDONALD et al., Ser. No. 295,656 filed Oct. 6, 1972, assigned to Vidar Corporation.

2. SCANNER BANK AND MESSAGE METERING SYSTEM, invented by GARY C. HENKICKSON et al., Ser. No. 321,376 filed Jan. 5, 1973, assigned to Vidar Corporation.

BACKGROUND OF THE INVENTION

The present invention relates to the field of telephone systems and particularly to message systems for detecting and storing information concerning subscriber usage and particularly to systems for digitally storing information concerning each of a plurality of metering lines associated with conventional telephone switching circuits.

Message metering equipment is necessary for recording information resulting from long distance, toll, local and other types of telephone service. Such equipment requires the ability to detect and store information to enable usage-sensitive charging of subscribers. Conventionally, local use by subscribers has been on a non-time-sensitive basis employing equipment which has not heretofore been readily adapted to timing. Such circuitry typically includes analog voltage levels which are not compatible with the logic levels of high-speed data processing circuits of modern data processing equipment. Because installed telephone equipment cannot be economically discarded, the installed analog circuits must be reliably adapted to be interfaced with high-speed message metering equipment.

High speed data processing circuits present a problem of cost and reliability when used in the real time acquisition of data such as telephone usage. Information which is used as a basis for charging subscribers must be reliable while also being economically obtained.

SUMMARY OF THE INVENTION

The present invention is an apparatus for metering subscriber usage in a telephone system and specifically for a storage system having internal cyclic memory locations which correlate one-for-one with subscribers. The memory locations are addressed in a sequential manner which corresponds to the sequential addressing of the subscriber lines. Each time a memory location and a corresponding subscriber is addressed, subscriber usage information is stored. Also during each address cycle, the system performs tests which verify whether or not error conditions exist.

In accordance with a preferred embodiment of the invention, the internal cyclic memory is implemented with a plurality of shift register stages, one stage per subscriber as well as additional test stages. The subscribers are organized on a directory number basis while the addressing circuits are organized on a binary number basis. Means are provided for deriving the correct directory number from the binary address.

In one preferred embodiment of the invention employing a shift register memory, reliability and sychronization of the memory is tested using memory locations assigned a predetermined code which is accessed and checked once each cycle of the shift register.

In order to further verify the reliability of the message metering system, predetermined locations in memory are correlated with information from a fixed address unit for the purpose of determining the operability of the memory system and the analog and digital data link over which information from the subscribers is transmitted to the memory system.

In accordance with another feature of the present invention, test call facilities are available for the purpose of detecting when any subscriber is being output from the system internal memory.

In accordance with the above summary, the present invention achieves the objective of providing a message metering system which cyclically stores information concerning the acitivity of a telephone system and cyclically tests the system for errors.

Additional objects and features of the invention will appear from the following description in which the preferred embodiments of the invention have been set forth in detail in conjunction with the drawings.

DETAILED DESCRIPTION

Overall System

Figure 1:
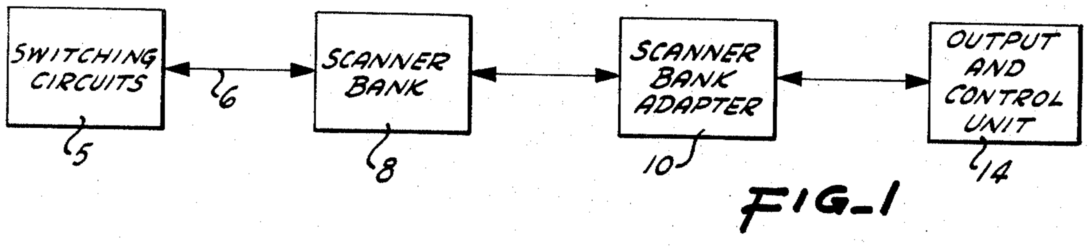
FIG. 1 depicts a schematic representation of a system in accordance with the present invention.

Referring to FIG. 1, a message metering system is depicted interconnected to subscriber metering lines. The subscriber metering lines 6 are output from switching circuits 5 and connected as inputs to the scanner bank 8. Switching circuits 5 are typically of the number 1 crossbar type well known in the field of telephony.

Figure 3:
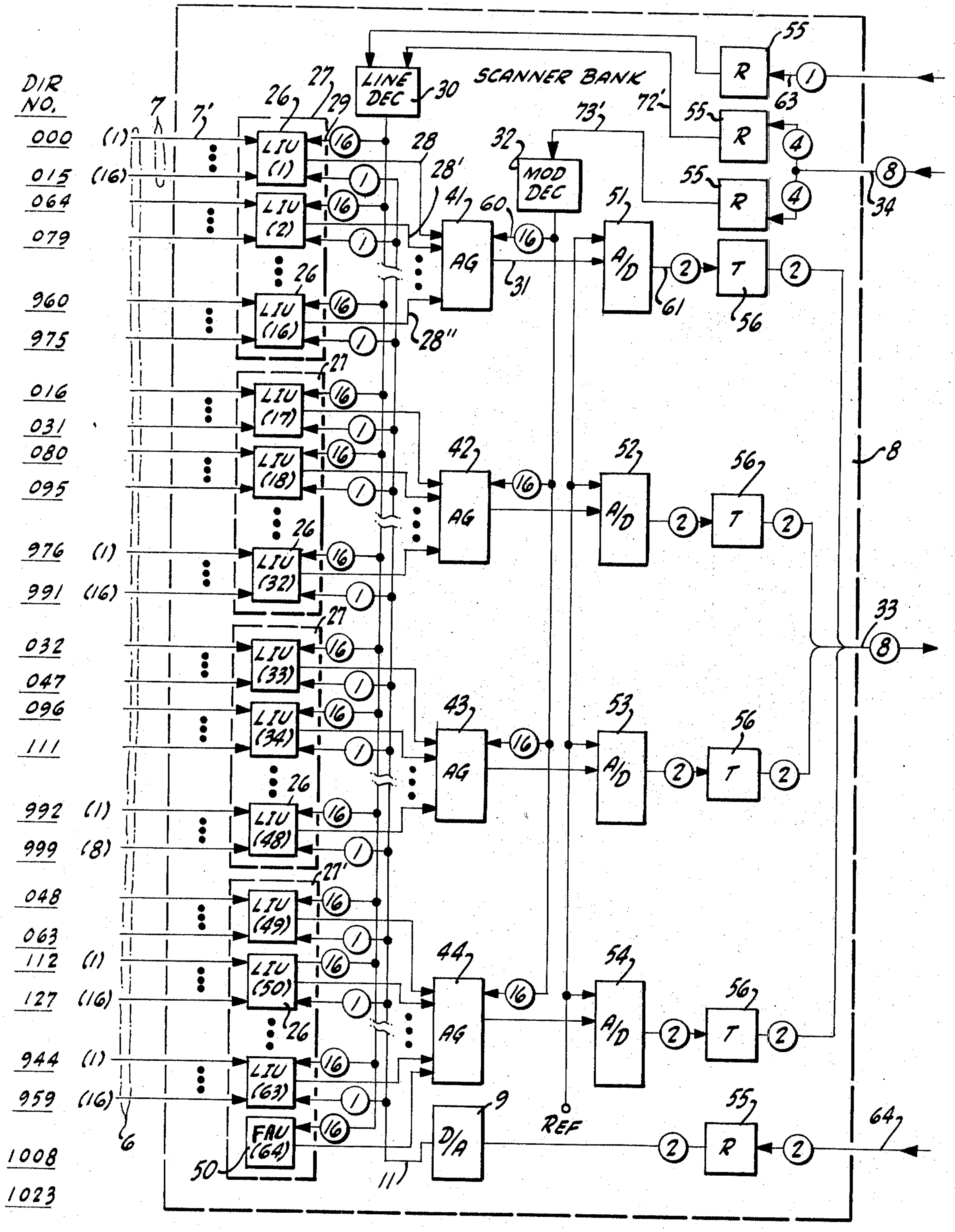
FIG. 3 depicts a schematic representation of the scanner bank in the system of FIG. 1.

In accordance with one embodiment of the present invention, the switching circuits are organized with outputs in groups of 1000 ($10^3$). Those outputs correspond to the contiguous subscribers defined by the three low order digits of telephone directory numbers having common higher order digits. The directory numbers are in the base 10 numbering system. The scanner bank 8 receives as inputs 1000 subscriber metering lines, one line associated with each subscriber signal. The scanner bank, for convenience, is organized in accordance with the binary number system and has provision for 1024 signals. The 24 extra location, in addition to the 1000 subscriber signals, are employed in connection with fault checking features of the system. Referring to FIG. 3, the scanner bank 9 periodically gates out 1024 signals, including the 1000 signals on the subscriber line inputs, to bus 33 in groups of four subscriber signals at a time. The subscriber signals are each defined by two binary bits. An 8-bit binary input address bus 34 periodically addresses and selects the outputs on bus 33. Each address bus 34 and each data bus 33 is connected between a scanner bank 8 and an associated scanner bank adapter 10. Additionally, a line 63 and two lines 64 connect, for error checking and control purposes, from each scanner bank adapter 10 to the associated scanner bank 8.

Referring to FIG. 1, the scanner bank adapter 10 receives one set from a total of 256 sets, of four 2-bit signals on buses 33 where the particular set of four is specified by the 8-bit binary address on bus 34. The address on bus 34 is derived from the scanner bank adapter 10.

Figure 4:
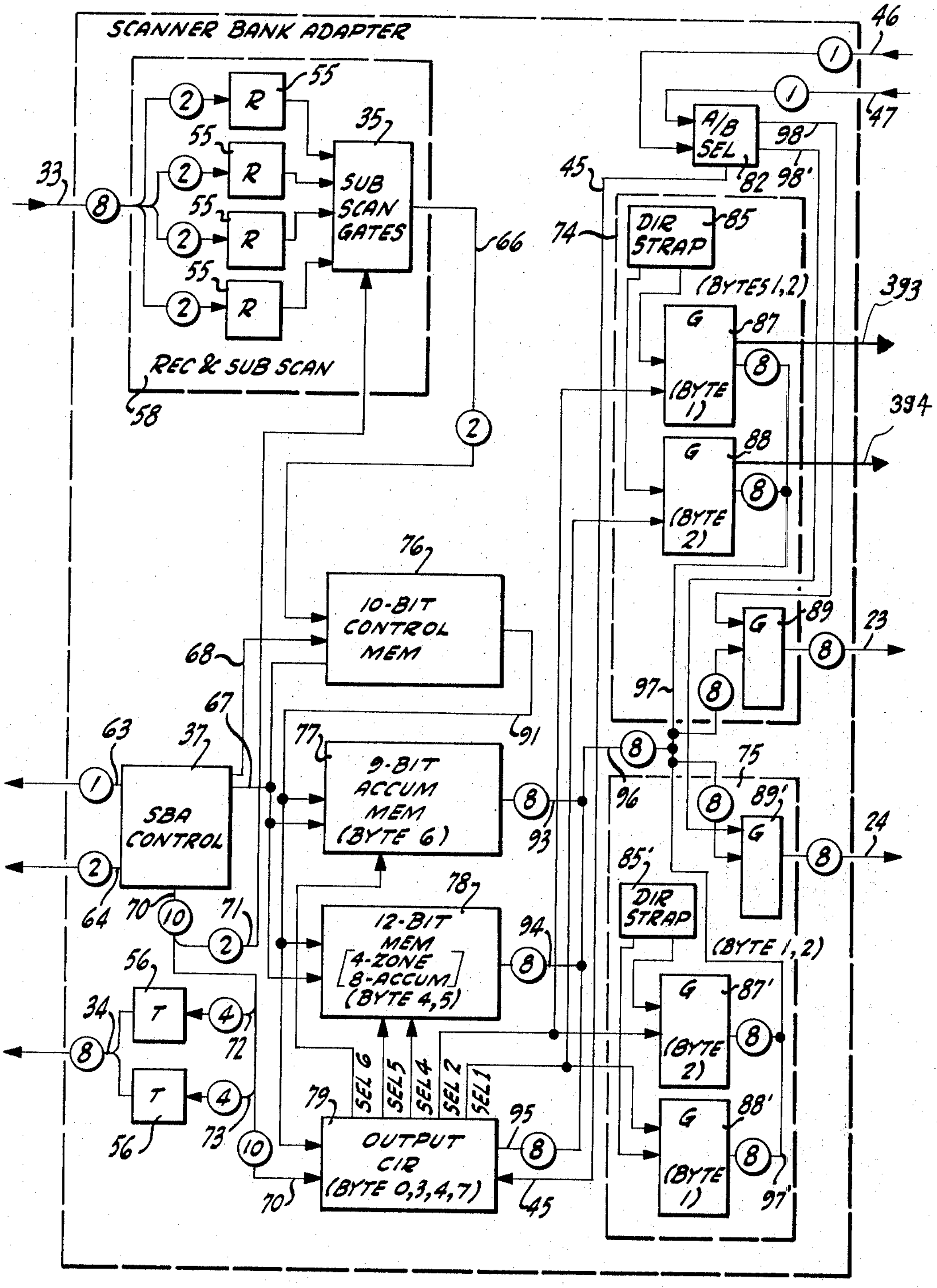
FIG. 4 depicts a schematic representation of the scanner bank adapter in the system of FIG. 1.

Referring to FIG. 4, the input data bus 33 to each scanner bank adapter 10 carries information in digital form about the subscriber usage. That information is analyzed by the adapter and stored to enable a data read out from the adapter at appropriate time to record the usage of the system by each subscriber. The information is read out on an output data bus to the output and control units 14 over one of two data paths, A or B. The selection of whether the data path A bus or the data path B bus is the active one is under the control of the select lines 47 and 46, respectively. The select lines 46 and 47 are energized by the output and control unit (OCU) 14.

Scanner Bank

Referring to FIG. 3, the scanner bank 8 of FIG. 1 is shown in detail. The 1000 lines 6, derived from the switching circuit 5 of FIG. 1, are inputs to a plurality of line interface units (LIU) 26, with 16 inputs per unit. The 16 input lines 7 to the LIU (1) are typical. Each LIU functions under control of input address lines 29, to select one of the 16 input lines and connect it to output line 28 as shown, for example, in connection with LIU (1). The particular one of the 16 input lines is gated to the one output line by appropriate selection of one of the 16 select lines 29. The 16 select lines are derived from a line decoder 30 which receives and decodes a 4-bit binary input on lines 72′ via receiver 55 and bus 34 to select one of its 16 outputs. Each of the 16 output select lines from the line decoder 30 is connected as an input to all the LIU units (1) through (63) and the fixed address-unit (FAU) 50. Groups of 16 LIU's 26 form a module 27 with 16 output lines connected as inputs to analog gates. Specifically, LIU (1), LIU (2), . . . , LIU (16) have their output lines 28, 28′, . . . , 28″ connected as the 16 inputs to the analog gates 41. Similarly, the LIU (17) through LIU (32) have their respective outputs connected as the 16 inputs to the analog gates 43. Finally the LIU (49) through LIU (63) have their outputs connected as the 16 inputs to the analog gates 44. The analog gates 41 through 44 are each operative to select one of their respective 16 inputs to form a single output to an analog-to-digital (A/D) converter. Specifically, analog gates 41, 42, 43 and 44 each have an output 31 which is connected as an input to the analog-to-digital converters 51, 52, 53 and 54, respectively. The selection of which one of the 16 inputs to analog gates 41 is connected as the output on line 31 is controlled by one of the 16 select lines 60 input in common to each of the gates 41 through 44. The select lines 60 are derived from the module decoder 32 which receives a 4-bit binary input on lines 73′ via receiver 55 and bus 34 and decodes it to energize one of its 16 outputs.

The operation of the decoders 30 and 32, in connection with the LIU's (1) through (16) and the analog gates 41 is to select one of 256 subscriber line input signals at any one time and connect that subscriber signal as an input to the analog-to-digital converter 51. The converter 51 senses the multi-value input on line 31 and encodes it into a 2-bit binary code on output lines 61. The signal on line 31 is typically at one of four levels (−48, GND, +9, +25 volts) defined after encoding by the two binary bits on lines 61. Lines 61 are connected as an input to the transmitters 56. Transmitters 56, one for each of the two lines 61, serve as a high impedance isolation, when connected through a corresponding receiver, between the scanner bank of FIG. 2 and the scanner bank adapter of FIG. 3. Simultaneously, the decoders 30 and 32 also select one of 256 of the subscriber signals from LIU's (17) through (32) for encoding to a 2-bit signal output from converter 52, one of 256 of the subscriber signals from LIU's (33) through (48) which produces the encoded putput from converter 53, and one of the 232 subscriber signals from the LIU's (49) through (63) or one of the 16 fixed values from FAU (64) to produce the encoded output from converter 54. The 2-bit outputs from each of the converters 51 through 54 are each, through transmitters 56, formed as the eight output lines of bus 33.

The LIU (48) includes only 8 used inputs so that together with the 992 inputs of the 62 LIU there are a total of 1000 subscriber inputs 6.

The fixed address unit (FAU) 50 receives the 16 address bits on address bus 29 from the line decoder 30. The unit 50 has its 16 address locations wired to selected marginal values which test the "REF" inputs to the analog-to-digital converters 51 through 54. Additionally, the unit 50 when addressed, tests the threshold values within the convertor 51 through 54. Additionally, the unit 50 when addressed, tests the threshold values within the converter 54. While the unit 50 has been shown with inputs only to converter 54 via gates 44, the fixed addresses can be distributed through the LIU (1) through (63) so that fixed addresses are connected to each of the converters 51 through 54 thereby testing each of those converters.

All of the LIU (1) through (63) have an analog input from line 11 derived from input 64 which is output from the scanner bank adapter 10 in FIG. 1. The input bits on line 64 function to define three values (high, normal and low) to test all of the units (1) through (63). Those three analog values are produced in the digital-to-analog (D/A) converter 9 on output line 11. Additionally, the line decoder 30 has an input via line 63 from the scanner bank adapter 10. That input line 63 functions to de-energize all units (1) through (64) so that none are selected.

While the LIU 26 in FIG. 3 have been indicated as each having 16 inputs except for LIU 48 which has 8 inputs, the order in which those inputs are addressed by the line decoder 30 and the module decoder 32 depends upon the address counter 143 described hereinafter in connection with FIG. 6. That address counter and accordingly the decoders 30 and 32 are operated on a binary basis. The input subscriber lines 6, however, are conventionally defined in terms of directory numbers where the sequence of the directory numbers does not necessarily correlate to the counting sequence of the address counter. In FIG. 3, the directory numbers (DIR.NO) are listed for a typical array. The first 16 lines 7 for LIU (1) correspond to directory numbers ending in 000 through 015. The 16 inputs for LIU (2) correspond to directory numbers ending in 064 through 079. Similarily, for LIU (16) the corresponding directory number inputs are 960 through 975. LIU (17) includes inputs 016 through 031. LIU (33) includes inputs 032 through 074. LIU (63) includes inputs 944 through 959. Finally LIU (48) includes the eight inputs 992 through 999. Note that the fixed address unit, while not actually having any directory number inputs has a binary address which corresponds to directory numbers 1008 through 1023. The binary addresses corresponding to directory number locations 1000 through 1007 are used in connection with another test feature described hereinafter.

Scanner Bank Adapter

Referring to FIG. 4, the scanner bank adapter 10 of FIG. 1 is shown in detail. The scanner bank 10 includes a receiver and subscan circuit 58 which receives the input data bits on buss 33. Circuit 58 scans the four pairs of input lines on bus 33 one pair at a time in gates 35 to select a pair, representing a single subscriber, as the output bus 66 from gate 35. Each one of the eight input lines for bus 32 is connected through a high impedance receiver 55. The selection of which of the four pairs of input lines on bus 33 is selected as the output 66 is under control of the two binary low order bits from the address generator in the SBA Control 37. Those two output low order bits appear on line 71 as an input to the gates 35. The binary control bits on line 71 are decoded in a conventional manner to select one of the four different pairs and connect the selected one on lines 66 as an input to the 10-bit control memory 76. Memory 76 has 1024 10-bit storage locations, one each for the 1000 subscribers signals, sixteen locations for the fixed addresses of the FAU (64) and eight additional locations for control and testing purposes. These eight additional locations account for the eight unused locations of LIU (48).

The 2-bit input line 66 to the memory 76 sequentially is connected to 1,024 different signals, 1000 of which represent usage information of telephone subscribers. The 2-bit binary code for each subscriber represents the four different states of each subscriber line 6 in FIG. 1 and that corresponding state for each subscriber is stored in the control memory 76. The memory address in the control memory 76 is incremented by the input from line 67 from the SBA line Control 37 in synchronism with the subscan control line 71 so that subscriber addressing and memory addressing is carried out in synchronism.

Figure 2:
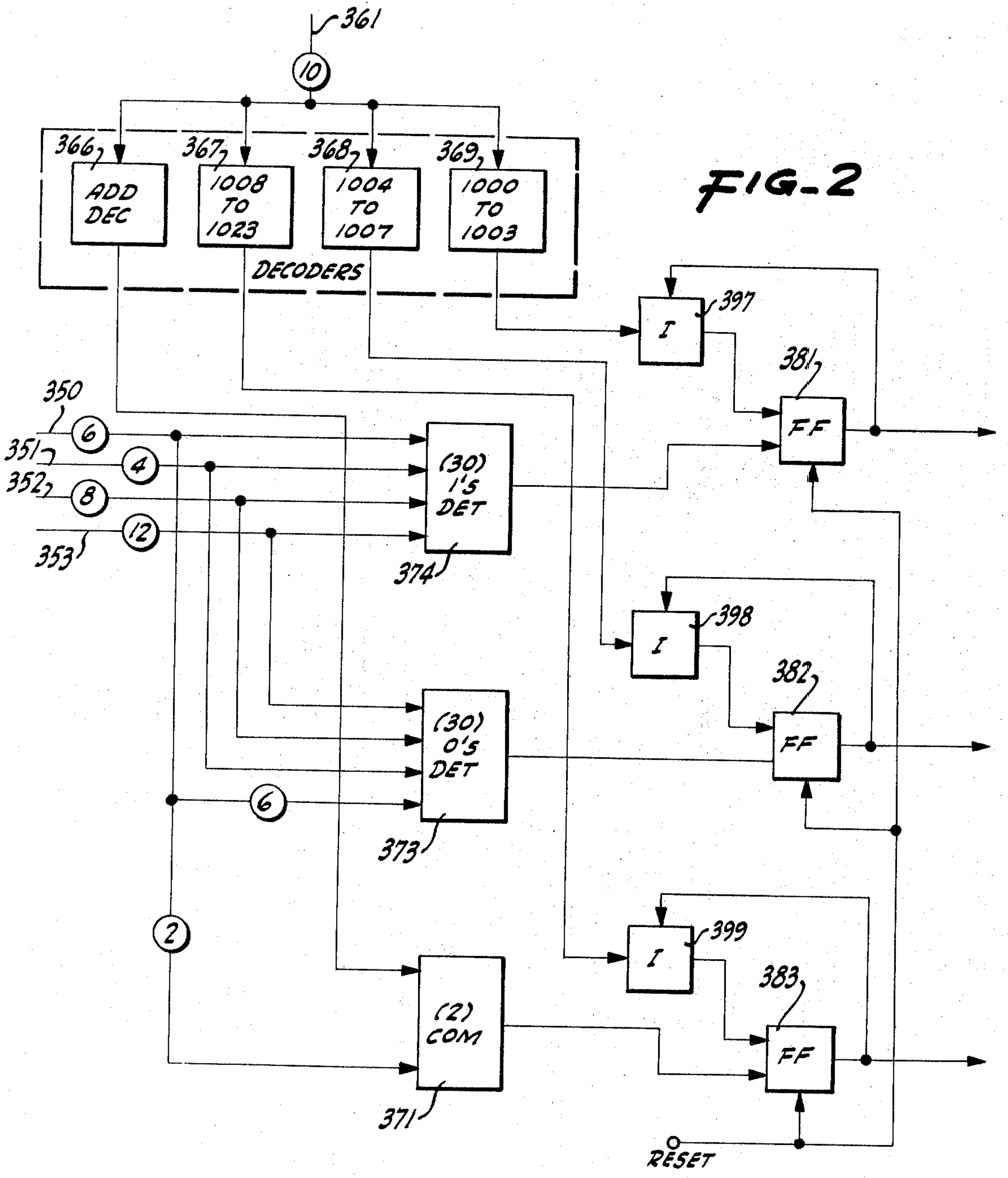
FIG. 2 depicts a schematic representation of the test logic which is part of the control circuitry within the scanner bank adapter of FIG. 1.

The address signals for selecting subscribers or fixed addresses in the scanner bank of FIG. 2 are derived from the SBA Control 37 as an output on 10-bit bus 70. Bus 70 has its two low order bits connected on line 71 to the subscan gates 35 as previously described. The next higher order four bits appear on line 72 and are connected through a transmitter 56 via bus 34 as an input in FIG. 2 to the receiver 55 and then via line 72′ to the line decoder 30 as previously described. Similarly, the highest order four bits are connected via line 73 through a transmitter 56 and bus 34 as an input in FIG. 2 to line 73′ to the module decoder 32 as previously described. Additionally, the ten binary addressing bits of bus 70 are input to the output circuit 79 in FIG. 3.

The SBA Control 37 in FIG. 3 also generates a control signal on line 63 which connects to the line decoder 30 in FIG. 2 for de-energizing simultaneously all LIU. Similarly, control 37 has a 2-bit output on line 64 which connects as an input to all LIU and which is used for test purposes. SBA Control 37 has a one second timing circuit which delivers an output pulse on line 68 to the 10-bit control memory 76 for incrementing the time accumulation register in memories 77 and 78 associated with each subscriber as control memory 76 periodically addresses a control memory location corresponding to the subscriber connected on the input lines 66.

The accumulators associated with each subscriber for measuring the call duration has a lower order 8-bit field (plus a ninth parity bit) in a 9-bit accumulator memory 77. The memory 77 includes 1024 locations associated on a one-for-one basis with the 1024 locations in the 10-bit control memory 76, that is, one for each of 1000 subscribers and 24 for control. Memory 77 is synchronously addressed by the input signal on line 67 in the same manner as 76. An additional 8-bits of accumulated memory, for each of the 1000 locations associated with subscriber, exists in the 12-bit memory 78. Memory 78 is addressed synchronously with the memories 76 and 77 via the input on line 67. In addition to the 8-bit higher order accumulation field, memory 78 includes an additional four bits for storing zone information associated with each subscriber call.

The output circuit 79 functions to control the gating out of information stored in memories 77 and 78 and certain other information via one of two redundant data paths A and B. The first redundant path includes data path A circuitry 74 and the second data path B circuitry 75. Each of the data path circuits 74 and 75 via gates 87 and 88 and 87′ and 88′, respectively, operates to connect to the outputs on buses 23 and 24, at appropriate times, binary-coded-decimal representations of the higher order four digits of each subscriber's 7-digit telephone directory number. That connection is done by the directory number straps 85 and 85′. The outputs from gates 87 and 88 and 87′ and 88′ are OR'ed together to form outputs on lines 97 and 97′ which are each connected in common with the output on bus 96 to form inputs to the gates 89 and 89′. Bus 96 is an OR'ed output of the bus 93 from memory 77, the bus 94 from memory 78 and the bus 95 from output circuitry 79. The input 8-bit buses to gates 89 and 89′ receive eight different bytes of data depending upon the selection output from output circuit 79. Those eight bytes of information and their contents are described hereinafter in further detail. Briefly, bytes 0, 3 and 7 and one-half of byte four are derived directly from the output circuit 79 and are gated over bus 95 to bus 96 as an input to gates 89 and 89′.

The other half of byte 4 and all of byte 5 are gated by the SEL 4 and SEL 5 lines as outputs on bus 94 to bus 96 and to gates 89 and 89′. Byte 6 is gated by SEL 6 line as an output on bus 93 to bus 96 as inputs to gates 89 and 89′.

Bytes 1 and 2 are generated by the directory straps 85 and 85′ and are gated as outputs on buses 97 and 97′ as inputs to the gates 89 and 89′ respectively.

The selection of which data path, data path A on bus 23 from gate 89 or data path B on bus 24 from gate 89′ is under control of the A/B select circuit 82 responsive to inputs 46 and 47 from the output and control unit 14 of FIG. 1. Circuit 82 is operative to select either gate 89 via line 98 or gate 89' via line 98' depending on the energization of input lines 46 or 47, respectively. When either line 46 or 47 is energized, the select circuit 82 energizes output line 45 to the output circuit 79 for signaling that a byte 0 transfer is requested for the scanner bank adapter 10 selected in the system of FIG. 1.

SBA Memories and Output Circuit

Figure 5:
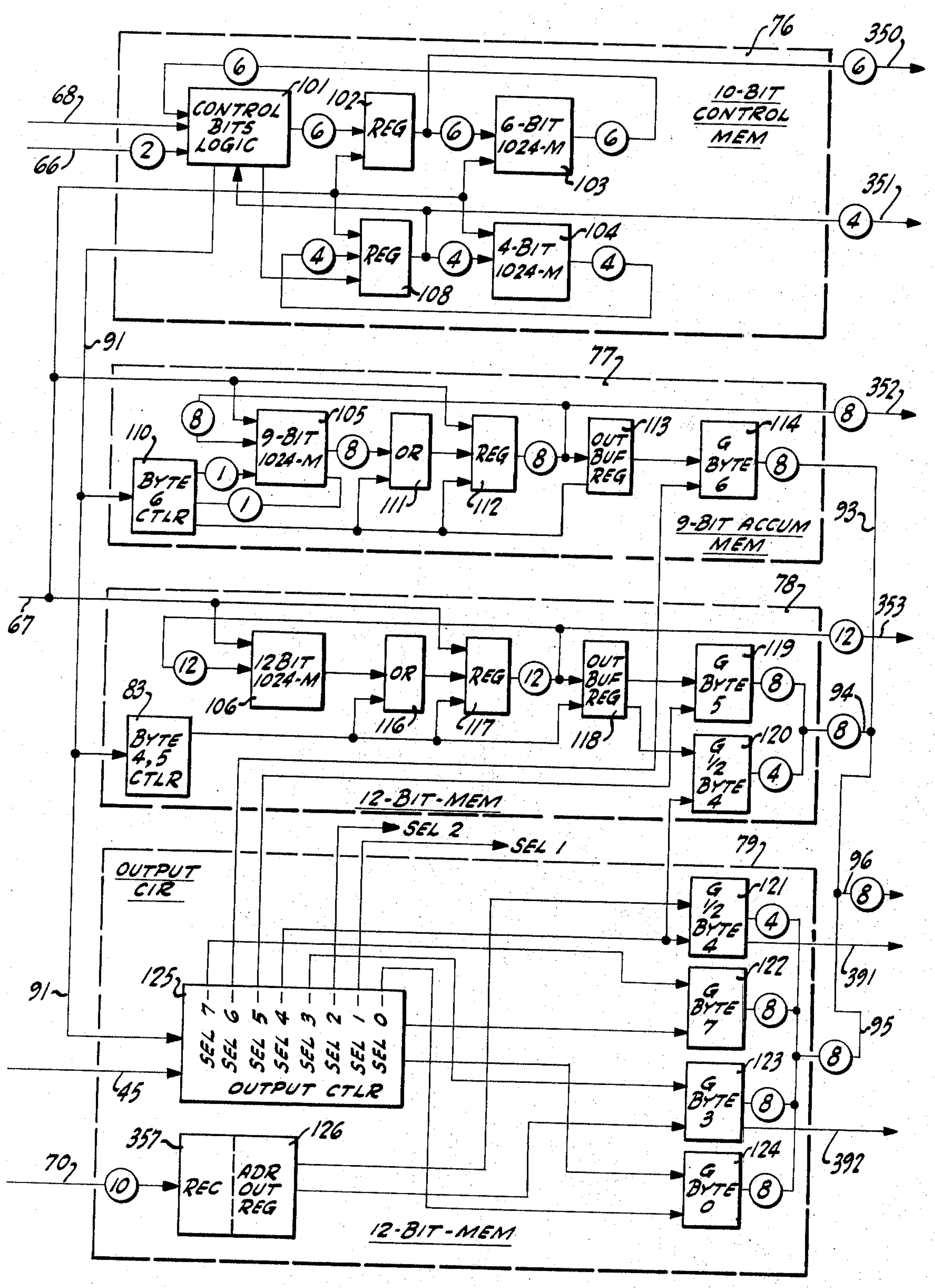
FIG. 5 depicts a schematic representation of the cyclically addressed memory and output circuits of the scanner bank adapter of FIG. 4.

In FIG. 5, the control memories 76 through 78 and the output circuit 79 of the scanner bank adapter 10 of FIG. 4 are shown in further detail. The 10-bit control memory 76 includes control bit logic 101 which receives the 2-bit encoded representation of subscriber signals on line 66, one at a time, as previously described and a one second timing input on line 68. Memory 76 further includes a 6-bit, 1-stage store in the form of register 102 and a 6-bit, 1024-stage shift register store 103. The 6-bit field associated with registers 102 and shift register stages 103 includes 4 bits associated with the M lead (line 7', for example) status, 1 bit for indicating a busy condition and 1 bit for indicating an output flag. Together, the register 102 and the shift-register stages 103 provide 1025 storage locations for six bits of control data. The data is shifted out of the shift register 103 back onto the control bits logic 101 where it is modified by logic 101 and re-entered into register 102 from where it is inserted into the shift register stage 103. The circulation through the loop takes 1025 stepping pulses which are received as clocking inputs on line 67 from the SBA Control 37 of FIG. 4 which is further described hereinafter in connection with FIG. 6.

Memory 76 stores and circulates an additional four bits through a 4-bit, 1-stage store in the form of registers 108 and a 4-bit, 1024-stage shift register 104. Register 108 and shift register 104 are stepped in synchronism with register 102 and shift register 103 by the same stepping input on line 67. Register 108 is loaded from the control bit logic and delivers its output back to the control bit logic 101 for storing an auxillary timing control field used for timing various events associated with the operation of memory 76.

The 9-bit accumulator memory 77 includes a 9-bit, 1024 stage shift register 105. An 8-bit output from stages 105 is connected through OR gate 111 to an 8-bit, 1-stage store in the form of register 112. The output from register 112 is reinserted at the input of shift register stages 105. Additionally, the output from register 112 is stored in an output buffer register 113 on command from the controller 110 which, under control of a SEL 6 line signal, is gated out on 8-bit bus 93 to bus 96. In memory 77, the byte six controller 110 functions to insert a parity bit associated with the circulating accumulated count in the memory stages 103, 104, 105 and 106. The memory 105 and register 112 are stepped by the stepping pulses on the input line 67. Controller 110 is responsive, via input line 91 from the control bits logic 101, to increment the count once in register 112, for each associated addressed subscriber signal on input line 66, in the conversation mode, for each timing pulse on line 68. The OR gates 111 are responsive to controller 110 to insert approoriate signals in the circulating accumulator in connection with control and testing functions of the system of FIG. 1.

The output buffer register 113 stores information whenever a disconnect signal indicates that a completed call has occurred and that data is to be read out to the output and control unit 14 of FIG. 1.

The 12-bit memory includes a 12-bit, 1024-stage shift register 106 which connects through OR gates 116 to a 12-bit 1-stage store in the form of register 117. The output of register 117 connects as the input to stages 106. Register 117 is gated out through a 12-bit buffer register 118 which has an 8-bit output through gate 119 and a 4-bit output through gate 120. The memory 78 stores in an 8-bit field an additional higher order eight bits of the accumulator field of which the lower order eight bits are stored in memory 77. Whenever an overflow is indicated from the 8-bit lower order accumulator field of memory 77, byte 4, 5 controller 83 causes an input to register 117 which increments the accumulator field associated with the currently addressed subscriber line on input line 66. The additional 4-bit field in memory 78 associated with the output gate 120 is for recording called zone information associated with the subscriber call for the subscriber on the currently addressed subscriber input on lines 66. The memory 106 and register 117 are incremented by the stepping pulses on input line 67 in the same manner as memories 76 and 77. The higher order eight bits of the accumulator field for memory 78 are gated out by gates 119 whenever the SEL 5 line is energized. One half of the zone field information is gated out by gate 120 whenever the SEL 4 line is energized. The output from gates 119 and 120 are connected in common via the 8-bit bus 94 to form outputs on the 8-bit bus 96.

The output circuit 79 of FIG. 5 includes an output controller 125 for energizing the eight select lines SELO, SEL1, . . . ,SEL7. Additionally, the output circuit 79 includes an address output register 126 which receives the 10-bit bus 70 from the SBA Control 37 of FIG. 3. Register 126 has its output connected to gate 123 and gate 121 which in turn have their outputs connected to the output bus 95 in turn connected to output bus 96. Circuit 79 additionally has output gates 122 and 124 for gating information out via bus 95 to bus 96.

The selection lines output from the controller 125 select desired ones of the output gates 114 and 119 through 124 as described hereinafter in further detail.

Output controller 125 operates to select those output gates based upon input information from lines 91 derived from the control bits logic 101 of control memory 76. Output controller 125 is additionally operable in response to the signal on line 45 from the selection circuit 82 in FIG. 3. Further details as to the operation of the controller 125 in selecting bytes of output data is described hereinafter in connection with the description of the operation of the FIG. 1 system.

SBA Control

The SBA Control 37 of FIG. 4 functions to control the addressing of the memories 76, 77 and 78 in FIG. 4 via its output line 67 which steps those memories one address location at a time. Simultaneously, Control 37 controls the addressing of the 1000 subscriber lines and the 24 control locations associated with the scanner bank of FIG. 2. Specifically, Control 37 addresses the subscriber lines via the 10-bit output binary bus 70 where the two low order bits, via line 71, connect to the subscan gates 35 in FIG. 3 and where the eight high order bits connect to the scanner bank 8 via the output bus 34, through transmitters 56.

Figure 6:
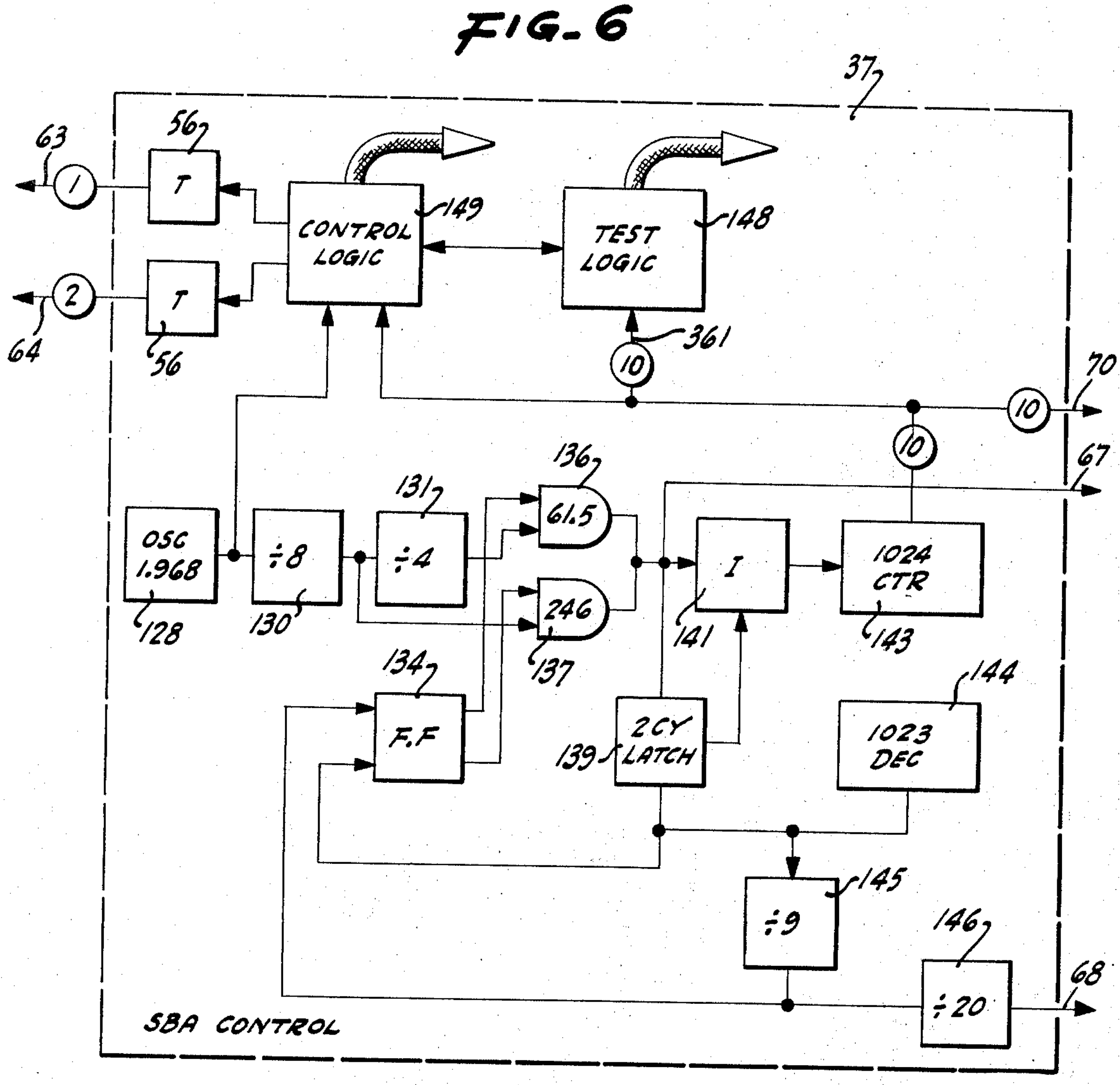
FIG. 6 depicts a schematic representation of the SBA CONTROL in the scanner bank adapter of FIG. 4.

In FIG. 6, the SBA Control 37 is shown in further detail. Control 37 includes an oscillator 128 having a frequency of 1.968 MHz which connects as an input to a divide-by-eight circuit 130 which produces a 246 KHz output as an input to a divide-by-four circuit 131 and as an input to gate 137. The divide-by-four output produces a 61.5 KHz output connected as an input to the gate 136. Gates 136 and 137 are responsive to control flip flop (FF) 134 for selecting one of the output frequencies 61.5 or 246 KHz which are connected to an inhibit circuit 141, to a two-cycle latch 139, and to the output stepping line 67. Except when inhibited by the latch 139, the inhibit circuit 141 connects the output from the selected one of the gates 136 and 137 into a 1024 counter 143. Counter 143 is conventionally a ten-stage binary counter having the 10-bit bus 70 which connects, as previously discussed, as the addressing output for addressing the subscriber and control locations.

Counter 143 also has an output to a 1023 decode circuit 144 which functions to detect whenever the 1024 counter 143 is in the 1023 count stage. Each complete cycle of counter 143 causes one occurrence of the 1023 value thereby providing an output from the 1023 decoder once per cycle. Each output from the 1023 decoder 144 is connected as an input to the two cycle latch 139 which functions to inhibit via inhibit circuit 141 any input to the counter 143 for one cycle of the signal output from either of the gates 136 or 137. Also, the output from the 1023 decoder 144 passes through a divide-by-nine circuit 145 and from there to a divide-by-twenty circuit 146. The output from the divide-by-nine circuit 145 is an input to flip-flop 134 which causes the flip-flop 134 to energize gate 136 and to energize gate 137 thereby selecting the higher output frequency of gate 137 once every nine cycles of counter 143 until counter 144 is reset after the ninth pulse. Divide-by-nine circuit 145 is typically a 4-bit binary counter which is reset after the ninth count. Similarly, divide-by-twenty circuit 146 is typically a 5-bit binary counter reset after the twentieth count.

The operation of the two cycle latch 139 in combination with the inhibit circuit 141 is to cause counter 143 to skip one count relative to the number of outputs on line 67 each cycle of counter 143. More specifically, for each revolution of the counter 143, there are 1025 output pulses on line 67. Each time the counter 143 reaches the 1023 state (once per cycle) it sets the two cycle latch 139 which causes inhibit circuit 141 to inhibit from counter 143 one of the pulses output from gates 136 or 137. That inhibited pulse, however, is output on line 67 to make a total of 1025 output pulses per 1024 count revolution of counter 143.

The SBA Control 37 of FIG. 5 further includes control logic 149 and test logic 148 for controlling and testing the operation of the system of FIG. 1. Control logic 149 produces through output transmitter 56, the 1-bit control signal 63 and the 2-bit control signal 64 transmitted to the scanner bank of FIG. 3 as previously described.

Referring to FIG. 2, details of the test logic 148 of FIG. 6 are shown. The test logic includes a plurality of decoders 366, 367, 368 and 369. Each of the decoders receives inputs from the 10 bits on lines 361 derived from the address counter 143 of FIG. 6. The decoders 366 through 369 function to decode the address in the address counter and provide outputs responsive to the address counter count. Specifically, the decoder 366 decodes the count in the address counter to provide a code which is, under error free condition, identical to the code provided by the fixed address unit 50 of FIG. 3. Decoder 367 functions to provide an enable output whenever the address counter has a binary address which corresponds to the directory number 1008 through 1023. The decoder 368 provides an output whenever the address counter has a binary count which corresponds to directory number 1004 through 1007. Decoder 369 provides an output whenever the address counter has a binary address which corresponds to directory number 1000 through 1003.

The outputs from decoders 367 through 369 function, if not inhibited by inhibit circuits 397 through 399, respectively, as enable inputs to the flip-flops 369 through 383, respectively. Whenever flip-flops 381 through 383 are set, they function with their outputs to inhibit further change by energization of the respective inhibit circuits 397 through 399.

Flip-flop 381 receives as its input the output from the all 1's detector 374. Detector 374 functions to set flip-flop 381, if flip-flop 381 is enabled by a pulse on its clock input from decoder 369, whenever detector 374 detects any 0 on its inputs. Detector 374 receives as its inputs the 30 bits of data on input lines 350 through 353 which are derived from the 30-bit circulating shift register stages of FIG. 5. Specifically, input 350 is derived from register 102 output within the 10-bit control memory 76 of FIG. 5. A 4-bit input line 351 is derived from the output of register 108 in the 10-bit control memory 76 of FIG. 5. The 8-bit input line 352 is derived from the register 112 in the 9-bit accumulator memory of FIG. 5. The 12-bit input line 353 is derived from the 12-bit circulating memory 78 of FIG. 5.

The detector 373 detects all 0's on the input lines 350 through 353 and, whenever a 1 is detected, it operates to set flip-flop 382 whenever flip-flop 382 is enabled on its clock input by a pulse from the decoder 368. After flip-flop 382 has once been set, it inhibits further change through inhibit circuits 398 which inhibits further clock inputs to flip-flop 382.

Comparator 371 functions to compare a coded value derived from address coded 366 to two bits of the six bits provided on line 350. The bits provided on bus 350 corresponds at times determined by the decoder 367, to the data supplied by the fixed unit 50 of FIG. 3. If at any time determined by decoder 367 the bits from decoder 366 do not compare with the bits derived from memory as provided by the fixed address unit on line 350, comparator 371 operates to set flip-flop 383.

The output on any of the flip-flops 381 through 383 indicates that the message metering system is not operating properly. These signals are used in any conventional manner to stop the operation of the system or otherwise render an appropriate alert. The reset line input to the flip-flops 381 through 383 functions to reestablish the flip-flops in their reset condition thereby enabling further normal operation.

In FIG. 5, the output circuit 79 includes a recorder 357 which functions to recode the address counter 143 address on lines 70 to a binary representation of the directory number associated with the binary address. The recoded binary number is latched in the address out register 126 from where, at appropriate times, it is gated by gates 121 and 123 as outputs on lines 391 and 392. Whenever the output circuit renders an output from gates 121 and 123 to the bus 95 outputs are produced also on the lines 391 and 392.

Figure 7:
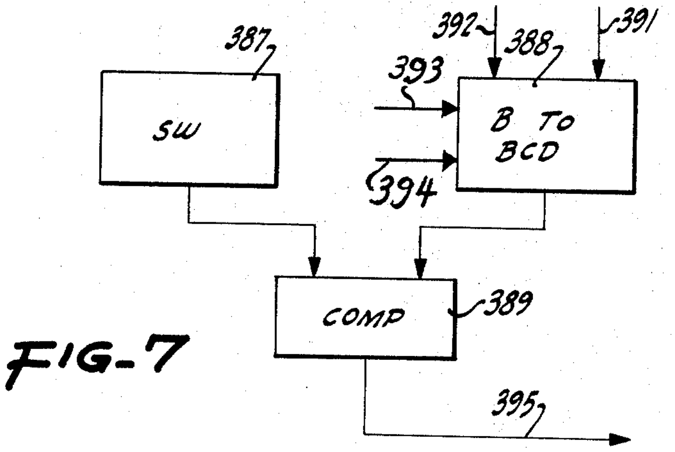
FIG. 7 depicts a schematic representation of test call circuitry employed as a feature of the present invention.

Referring to FIG. 7 additional circuitry within the test logic 148 of FIG. 6 is shown. Binary to Binary-coded-decimal converter 388 receives the directory number input on lines 391 to 394 as derived from the gates 87, 88, 121 and 123. The low order bids of the directory number are derived by gates 121 and 123 from the address out register 126 which contain the recoded address derived from the counter 143 in FIG. 6. The recoded address, is, of course, the correct binary representation of the directory number which is being gated out to the output and control unit 14 of FIG. 1. The switches 287 are either manually or automatically set with a directory number which it is desired to search to determine when or if an output is generated by the circuitry of FIG. 5. Switches 387 have a binary-coded-output decimal which, along with the output from the converter 388, serve as the inputs to the comparator 389. Whenever the address specified by switches 387 compares with the output of converter 388, a signal is provided on output line 395. The signal on 395 is typically used by the output and control unit 14 of FIG. 1 to inhibit a charge to the subscriber when test calls are made with a subscriber number.

Metering System Operation

The message metering system of FIG. 1 operates to sense and analyze the multistate signals for each subscriber in the switching circuits 5 of FIG. 1. Referring to FIG. 3, the input signal on line 7', for example, is transmitted to the analog gate 41 when decoder 30 selects the address, as specified by four address bits, of input line 7' and connects it as the output on line 28. Typically, line 7' is address 000 where the three 0's represent the three base 10 lower order digits of a directory number. The appropriate one of the analog gates 41 is further selected by the module decoder 32, as specified by the four high order address bits, selecting LIU (1) and connecting input line 28 to line 31 which connects the input signal on line 7' corresponding to directory number 000, as attentuated by the transmission path, to the A-to-D converter 51. Simultaneously, with the connection of input line 7' to the A-to-D converter 51, three other similar signals corresponding to directory numbers 016, 032 and 048 are connected via gates 42, 43 and 44 to the A-to-D converters 52, 53 and 54, respectively. A-to-D converter 51 continuously compares the amplitude of the signal on line 31 with the REF input signals to form digital outputs on line 61 representative of the four different states (−48, GND, +9 and +25 volts). Each time the amplitude of the input signal changes, the encoded value on lines 61 also changes.

Transmitters 56 via bus 33 transmit the encoded value on lines 61 through the corresponding receivers 55 in FIG. 4. The subscan gates 35 in FIG. 4, under control of the two low order address bits on lines 71 selects the encoded value from converter 51 as the output on line 66. The addressing of SBA Control 37 functions, therefore, to connect the subscriber line 7' encoded value as the input to control memory 76 on line 66. Simultaneously, with the addressing of subscriber line 7' the stepping pulse outputs on line 67 have stepped (or addressed) the memories 76, 77 and 78 to a unique one of 1024 locations corresponding only to subscriber line 7'. The 10-bit control memory 76 functions to store the value of the encoded signal on line 66 but does not change the control memory stored value until the addressing is completely cycled through all subscribers and again returns to line 7'. After two successive scans of line 7', which occurs after two cycles of the counter 143 in the SBA Control of FIG. 5, the memory 76 is updated if the result of the scans is identical. The requirement of two successive like scans of the signal on line 7' before changing the memory helps to reduce errors in the signal detection and is a form of digital integration. The frequency of scanning signals on line 7' and on each of the other subscriber lines is of the order of five times the minimum valid pulse width of any pulse on the input line.

At the same time that the directory number 000, that is line 7', is being sampled by the LIU (1), the lines for directory numbers 016, 032, and 048 are simultaneously being sampled by LIU (17), LIU (23) and LIU (49). The information from those lines is transmitted to the receiver and sub-scan circuitry 58 in FIG. 4. The sub-scan gates 35 sequentially scan the four signals and store the information in the circuitry shift register memories 76, 77 and 78. The information for directory numbers 000, 016, 032 and 048 is stored contiguously in the first four stages of the circulating shift register memory respectively. Each time the sub-scan gates are incremented by one count, the memory is similarly incremented one stage. As indicated, the first four stages store information corresponding to directory numbers 000, 016, 032 and 048. The second four stages store the information corresponding to directory numbers 001, 017, 033, and 049. The third group of four stages store information for directory numbers 002, 018, 034, and 050. Interspersed with the information corresponding to the 1000 directory numbers 000 through 999 is 24 stages of test information. The test information is considered for convenience to be at address locations 1000 through 1023 using a fictitious directory number code. In locations 1000 through 1003 contain all 1's in the manner described in connection with FIG. 2. The locations 1004 through 1008 are similarly stored with all 0's also used in connection with the circuitry of FIG. 2. Finally, the address locations 1008 through 1023 corresponds to information in the fixed address unit 50 of FIG. 3.

The sequence for storing information relating to the test locations and the directory number lines proceeds in the manner previously described in connection with FIG. 3. A typical position of the sequence at a given point in time has directory number 967 connected through analog gate 41 and A-to-D converter 51 thereby forming one of the four outputs on bus 33. At the same point in time, directory number 983 is connected through analog gate 42 and converter 52 forming a second output on bus 33 and directory number 999 is connected through analog gate 43 and converter 53 forming the third output on bus 33. Finally, the test location 1015 in the fixed address unit 50 connects through gate 44 and converter 54 forming the fourth output on bus 33. Those four outputs on bus 33 are simultaneously input to the receiver and sub-scan circuitry 58 of FIG. 4. The sub-scan gates 35 cause the information on bus 33 from those four locations to be contiguously stored in four adjacent stages of the circulating memories 76 through 78. The storage is carried out over four successive cycles where the memories are stepped one stage per cycle. The next four stages in memory store information from directory numbers

968, 984, 1000, 1016. The sequence continues in the manner indicated until the last four stages of memory are filled with information relating to directory numbers 975, 991, 1007 and 1023.

It should be noted in the above storage and addressing sequence that any location exceeding 999 is a test location containing test information for testing whether or not a fault condition exists in the message metering system. The circulating shift register memories 76 through 78 and counter 143 each include 1024 stages so that they are in synchronism.

Accordingly, the count contained in counter 143 addresses a unique location in the circulating memories 76 through 78. As also previously indicated, the count in counter 143 also uniquely addresses one of the 1000 directory number lines 000 through 999 or one of the 24 test locations 1000 through 1023. The circuitry of FIG. 2 having the decoders 366 through 369 takes advantage of the one for one mapping of the directory number and test locations into memory addresses.

The operation of the FIG. 2 circuitry is to decode that binary count of counter 143 which corresponds to the appropriate test location address. It is assumed for purposes of explanation that the memory locations have an address zero which corresponds with the counter 143 zero. The following CHART I defines the directory number or test location address (in decimal notation) with the corresponding count in the binary counter (also indicated in decimal notation).

CHART I

| Dir. No. or Test Location | Binary Ct. | DEC. 366 |
|---|---|---|
| 1000 | 994 | |
| 1001 | 998 | |
| 1002 | 1002 | |
| 1003 | 1006 | |
| 1004 | 1010 | |
| 1005 | 1014 | |
| 1006 | 1018 | |
| 1007 | 1022 | |
| 1008 | 963 | 1 0 |
| 1009 | 967 | 0 0 |
| 1010 | 971 | 1 1 |
| 1011 | 975 | 0 1 |
| 1012 | 979 | 0 1 |
| 1013 | 983 | 1 1 |
| 1014 | 987 | 0 0 |
| 1015 | 991 | 1 0 |
| 1016 | 995 | 0 1 |
| 1017 | 999 | 1 1 |
| 1018 | 1003 | 0 0 |
| 1019 | 1007 | 1 0 |
| 1020 | 1011 | 1 0 |
| 1021 | 1015 | 0 0 |
| 1022 | 1019 | 1 1 |
| 1023 | 1023 | 0 1 |

Referring to FIG. 5, control logic 101 senses and stores the information conditions on lines 66 and analyzes the information to determine if a call has been initiated. If a call has been initiated, timing of the call commences after the first zone pulse. The call duration is timed under control of logic 101 which functions to insert timing bits into the accumulators of memories 77 and 78, at locations unique to the addressed subscriber line, each time a timing pulse is received on timing line 68 while the initiated call continues.

In accordance with the above chart, decoder 367 is operative to decode the binary counts equivalent to the decimal numbers which run from 863 through 1023 in four unit jumps. Address decoder 368 is operative to decode the binary counts equivalent to the decimal values 1010, 1014, 1018 and 1022. Decoder 367 is operative to decode the binary counts equivalent to the decimal values 994, 998, 1002 and 1006. Also as shown in CHART I, decoder 366 provides the outputs indicated in binary notation by the column "DEC 366." The outputs from decoder 366 are shown only for the test locations 1008 through 1023, which correspond to the fixed address unit normal outputs. The fixed address outputs are described in the above identified application entitled SCANNER BANK AND MESSAGE METERING SYSTEM, which is hereby incorporated by reference in this specification for the purpose of teaching the operation of the fixed address unit.

Additionally, the controller 83 causes the zone count 4-bit memory 78 to be incremented to count the number of zone pulses as indicated by the signal on input line 66. The zone information for each subscriber is stored in four bits of the 12-bit circulating memory which are uniquely associated with the respective subscriber.

The accumulators of memories 77 and 78 are continually incremented with 1 second pulse timed by line 68 in FIG. 4 until the call duration terminates. When a termination of a properly initiated call occurs either by the called party or the calling party going on-hook, control logic 101 senses the termination and sets an output flag in the 6-bit control field of memory 103. The output flags are available via lines 91 to the output controller 125. Output controller 125 stores a call terminated flag in the byte 0 position which indicates that the select lines SEL0, SEL1, . . . ,SEL7 are to be sequentially energized for gating out in addition to byte 0, the seven bytes 1, 2, . . . ,7 from the scanner bank adapter which are associated with the particular subscriber. The bytes are gated out when the SBA is selected by a signal on lines 46 or 47 from the control unit 14. Each time control unit 14 selects the SBA, a byte 0 of data is sent to the control unit 14. If that byte 0 has the call termination flag set, that byte 0 flag indicates to the control unit 14 that a data readout of seven more bytes is to occur from the scanner bank adapter. Any of the 1000 subscribers can set the byte 0 flag. The transfer of data from the SBA to the unit 14 is asynchronous with respect to the SBA scanning. Specifically, the output buffer registers 113 and 118 allow readout from memories 77 and 78 to be controlled by the unit 14 timing.

Assuming that data path A circuitry 16 rather than data path B circuitry 18, is operational, the 8-bit byte 0 transfer from SBA to circuitry 16 includes bits 0 through 7. Bits 0 through 7 include the information "Response," "SBA Fail," "Output Flag," "LIU Fail," "SB Fail," "SB Power Fail," "Response," respectively. With the bit 3 "Output Flag" set in byte 0, byte 1 is thereafter transmitted to unit 14 by energization of the SEL1 line from the controller 125 in FIG. 5 which in turn energizes gate 87 in FIG. 4. Byte 1 includes 8-bits of binary-coded-decimal information defining the directory strap number established by strap circuit 85 in FIG. 4. Similarly, the SEL2 output from the output circuit 79 selects gate 88 which gates an additional eight bits of binary-coded-decimal directory strap information also set by circuit 85 in FIG. 4. Bytes 1 and 2, therefore, include 16 bits of binary-coded-decimal information which define the four higher order digits of the subscriber directory numbers for the subscribers associated with lines 6 in FIG. 1.

For byte 3, the SEL3 line from the controller 125 of FIG. 5 energizes gate 123 which selects the high order eight binary bits of the binary address of the associated subscriber. For byte 4 the SEL4 line is operative to gate out the two remaining binary bits of the subscriber address from register 126.

The recorder 357 receives the output from the binary counter 143 on lines 70 and recodes that output from a straight sequential binary code to a binary code sequence which correlates with the directory number sequence of scanning indicated in FIG. 3. More specifically, the straight binary code on lines 70 is specified by 9, 8, 7, 6, 5, 4, 3, 2, 1 and 0 in decreasing order of exponential 2. That is, the 9 position represents $2^9$, the 8 position represents $2^8$ and so forth. The recoder 357 takes that conventional straight binary code and recodes it to the directory number code 9, 8, 7, 6, 1, 0, 5, 4, 3, and 2. The order in which unit inputs are stepped through the directory number code is the same as for the straight binary code. More specifically, a one bit change in address causes a change in the 0 position. A carry out from the 0 is a change in the 1 position. A carry out from the 1 position is a change in the 2 position and so forth. Even though the carries in the directory number sequence are the same as the carries in the binary address sequence, the output interpretation of the directory number sequence is in accordance with the binary position. The 2 position represents $2^0$, the 3 position represents $2^1$, the 4 position represents $2^2$, the 5 position represents $2^3$, the 0 position represents $2^4$ and the 1 position represents $2^5$. The positions 6 through 9 represent $2^6$ through $2^9$, respectively, the same as in the binary code. With the recoding carried out in this manner, a unit change in the directory number sequence causes a change in the 0 position which is an incrementing of the directory number by $2^4$. A second change in the 0 position causes a carry out to the 1 position which is a change in a $2^5$ digit. As can be seen by correlating the recoding scheme with the connection scheme as outlined in the left hand column of FIG. 3, the register 126 in FIG. 5 always records, in binary notation, the directory number currently being addressed by the message metering system.

Byte 4 also includes four bits of zone information output from gate 120 in bit locations, 4, 5, 6, and 7. Bits 1 and 2 of byte 4 are unused.

For byte 5, the SEL5 line is operative to gate out the higher order eight bits of the accumulator memory 78 which bits represent, in part, the length of the conversation period.

For byte 6, the SEL6 line is operative to energize gate 114. Byte 6 includes the lower order eight bits of the accumulator of memory 77 which measures with byte 5 the duration of the conversation period.

For byte 7, the SEL7 line from the controller 125 is operative to energize gate 122. Byte 7 includes flags in the lower order 4-bit positions which are useful for control purposes of the system of FIG. 1. The locations 4 and 5 of byte 7 include data 1's for indicating that it is the last byte of data transferred by the scanner bank adapter. Bit locations 6 and 7 of byte 7 are unused.

If a test call has occurred in the system as recognized by the cir uitry of FIG. 7, a flag is inserted into the buffer byte 7 locations in bit 4 and bit 5.

Operation Frequencies

As was previously indicated in connection with the description of FIG. 6, the address counter 143 of FIG. 6 is stepped at two different frequencies. During the scanning mode each of the subscriber lines is sent an address under control of the output from gate 136 in FIG. 6. The system addresses each subscriber line and concurrently updates the memories 76 through 78 in FIG. 4 in the manner previously described. The addressing of each subscriber occurs over a 16 ⅔ millisecond period once each 50 milliseconds. During the remainder of the 33 ⅓ milliseconds of each 50 millisecond period, gate 137 of is in operation for controlling scan out of information via the buffers 113 and 118 in FIG. 5 and through the gates 114 and 119 through 124 of FIG. 5 and gates 87, 88 and 89 and 87', 88' and 89' of FIG. 4 all in a manner previously described.

During the output mode, the counter 143 of FIG. 6 makes eight complete cycles while during the scanning mode the counter 143 makes one cycle. In this manner, the addressing of the memory locations for the readout mode is carried on at a different frequency than the addressing for the scanning mode. After the twentieth 50 millisecond period an output timing pulse occurs on line 68 in FIG. 6 which represents one second.

We claim:

1. A message metering system for metering the usage of a plurality of subscriber lines of a telephone system, the improvement comprising, a plurality of addressable line interface units for selecting, when addressed, selected ones of said subscriber lines, memory means having memory locations corresponding to each of said subscriber lines, means for cyclically addressing said line interface units and for concurrently addressing said memory means whereby each of said memory locations and each of the corresponding subscriber lines is accessed during each cycle for storing usage information derived from said subscriber lines in corresponding locations in memory.

2. The system of claim 1 wherein said memory means includes a plurality of shift register stages with at least one stage per subscriber line.

3. The system of claim 2 wherein said shift register stages additionally include a plurality of test stages which are accessed sequentially for cyclically testing the message metering system.

4. The system of claim 3 wherein one of said test stages is set to a binary one and another of said test stages is set to a binary zero and wherein said system further includes means for cyclically sensing whether or not said test stages are set to binary one and binary zero, respectively, to test for faults in the operation of the system.

5. A message metering system for metering the usage of a plurality of subscriber lines in a telephone system comprising, a plurality of gate means for selecting, when addressed, selected ones of said subscriber lines, memory means having memory locations, one for each of said subscriber lines and a plurality of test locations for test information, address means for sequentially addressing said gate means and said memory means to access sequentially said subscriber lines to store concurrently information in corresponding memory locations and to access sequentially said test locations to test said system.

6. The system of claim 5 wherein one of said test locations is set to a predetermined code and wherein said system further includes means for comparing the contents of said test locations with a standard derived from said address means to determine if said system correctly accesses said predetermined code.

7. The system of claim 6 wherein said predetermined code includes one memory location having all one's and another memory location having all zero's and wherein said means for detecting includes an all one's detector and an all zero's detector for detecting if said one memory location has all one's and whether said another memory location has all zero's.

8. The system of claim 5 further including a fixed address unit addressable by said address means for providing predetermined signals through said gate means to said memory means, and further including comparator means for comparing the signals derived from said fixed address units with a standard signal thereby testing said system.

9. The system of claim 8 wherein said address means includes an address counter for specifying addresses in said memory and for addressing corresponding subscribers through said gate means, and wherein said system further includes a decoder for decoding the address in said address counter to provide signals which form a standard which is compared with the corresponding contents of memory test locations to determine if the system is operating properly.

10. The system of claim 9 further including a decoder for sensing said address counter to enable the output of said comparator means whenever test locations are specified by said address counter.

11. The system of claim 5 wherein said address means further includes an address counter for specifying predetermined one's of said subscribers and predetermined corresponding locations in said memory means, and wherein said system further includes a plurality of decoders for decoding predetermined addresses corresponding to test locations for enabling the output of test circuits.

12. The system of claim 10 wherein said address counter counts over a range of 1024 addresses and said decoders specify 24 addresses for test locations.

13. The system of claim 5 wherein the subscribers have directory numbers from 000 to 999 and wherein the binary counter has a straight binary code with bit positions 9, 8, 7, 6, 5, 4, 3, 2, 1 and 0 which define the 1000 subscribers and 24 test locations as powers of 2 in accordance with their position in the code sequence with carries propagated from 0 to 9.

14. The system of claim 13 wherein the subscribers are addressed by said address means in accordance with the subscriber code 9, 8, 7, 6, 0, 1, 5, 4, 3, and 2 as powers of 2 in accordance with their position in the code with carrier propagated from 0 to 9, and further including means for recoding and storing said straight binary code to said subscriber code for indicating in binary notation subscriber directory number.

15. The system of claim 11 further including means for storing the address corresponding to completed and terminated subscriber calls, storage means for storing a predetermined subscriber number, and comparator means for comparing said predetermined number with said address for identifying when the metering system is outputing said predetermined subscriber number.

* * * * *

PO-1050
(5/69)

UNITED STATES PATENT OFFICE

CERTIFICATE OF CORRECTION

Patent No. 3,825,689 Dated July 23, 1974

Inventor(s) JOHN C. McDONALD & JAMES R. BAICHTAL

It is certified that error appears in the above-identified patent and that said Letters Patent are hereby corrected as shown below:

IN THE ASSIGNEE'S NAME:

Cancel the name "Vidor Corporation" and substitute therefor --Vidar Corporation--.

Signed and sealed this 29th day of October 1974.

(SEAL)
Attest:

McCOY M. GIBSON JR.
Attesting Officer

C. MARSHALL DANN
Commissioner of Patents